G. F. BALLOU.
Slide Rests for Metal Turning Lathes.

No. 167,974. Patented Sept. 21, 1875.

WITNESSES:
E. Wolff
A. F. Terry

INVENTOR:
George F. Ballou
BY Munn & Co
ATTORNEYS.

UNITED STATES PATENT OFFICE.

GEORGE F. BALLOU, OF PAWTUCKET, RHODE ISLAND, ASSIGNOR TO HENRY N. FISHER AND JOHN E. WHITCOMB, OF WALTHAM, MASSACHUSETTS.

IMPROVEMENT IN SLIDE-RESTS FOR METAL-TURNING LATHES.

Specification forming part of Letters Patent No. 167,974, dated September 21, 1875; application filed June 10, 1875.

*To all whom it may concern:*

Be it known that I, GEORGE FREDERICK BALLOU, of Pawtucket, in the county of Providence and State of Rhode Island, have invented a new and Improved Slide-Rest, of which the following is a specification:

My invention consists of a slot in the end of the stationary part on which the rest slides, so connecting with the space or chamber in which the nut works, and, together with said space, extended out through the end of said part, that the slide-rest can be readily put on and taken off without detaching the nut, as it has to be in the common arrangement.

Figure 1:
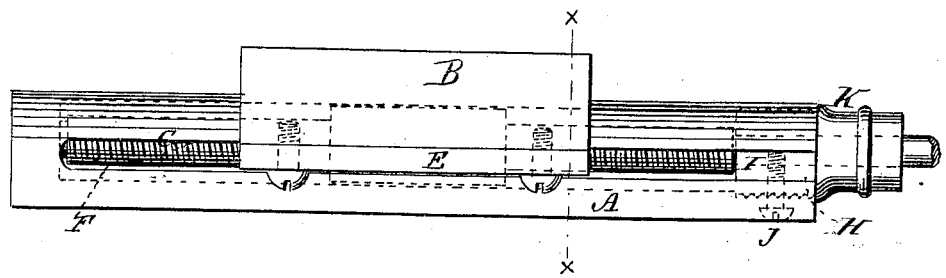
Figure 2:
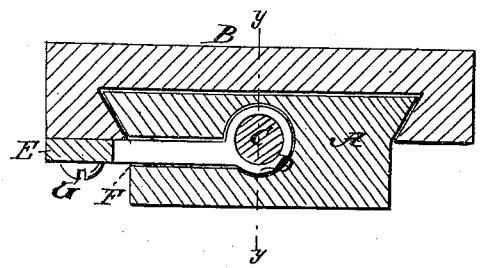
Figure 3:
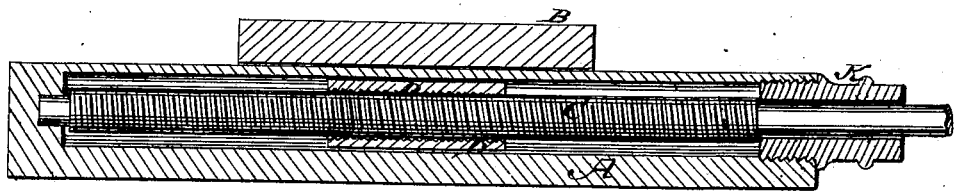

Figure 1 is a side elevation of my improved slide-rest. Fig. 2 is a transverse section taken on line *x x* of Fig. 1; and Fig. 3 is a longitudinal section on line *y y* of Fig. 2.

Similar letters of reference indicate corresponding parts.

A is the stationary part of the slide-rest; B, the sliding part; C, the screw, and D the nut for working the slide, the nut being bolted to the slide by the shank E projecting out through the slot F in the side of the part A. Heretofore this slot F has been cored out at one part sufficiently to insert the nut, which was then screwed onto the slide by screws G, after it was put on part A. I now propose to extend this slot to one end, as at H, and also extend the nut-chamber out through the end, so that the shank E and the nut D can be slided into place at the same time the slide B is put on, the shank and the slide being at the same time screwed together. Then a plate with a hole for the screw may be screwed onto the end of piece A, to form the bearing for the screw, and to strengthen part A at the slot H; but a preferable arrangement is to fill the slot with a block, I, at the end, and bind all fast with the screw J, and screw a bush, K, in the end, for the bearing of the screw.

Having thus described my invention, I claim as new and desire to secure by Letters Patent—

1. The part A of the slide-rest, having the slot for the shank of the nut, and the chamber for the nut extended out through one end in such manner that the nut can be put in and taken out, and the slide put on and taken off, while connected together, substantially as specified.

2. The bush K, combined with the part A of the slide-rest having the slot for the shank of the nut, and the chamber for the nut, extended out through one end, substantially as specified.

3. The combination of the block I and the screw J with the part A of a slide-rest having the slot for the shank of the nut extended out through one end, substantially as specified.

GEORGE F. BALLOU.

Witnesses:
CARROLL D. WRIGHT,
SAML. M. BARTON.